US011164335B2

(12) United States Patent
Zhang et al.

(10) Patent No.: US 11,164,335 B2
(45) Date of Patent: Nov. 2, 2021

(54) PASSENGER TRAVEL ROUTE INFERENCING IN A SUBWAY SYSTEM

(71) Applicant: INTERNATIONAL BUSINESS MACHINES CORPORATION, Armonk, NY (US)

(72) Inventors: Xin Zhang, Beijing (CN); Peng Gao, Beijing (CN); Zhi Hu Wang, Beijing (CN); Ning Duan, Beijing (CN); Gang BJ Ning, Beijing (CN); Yan Fang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 16/181,744

(22) Filed: Nov. 6, 2018

(65) Prior Publication Data
US 2020/0143566 A1  May 7, 2020

(51) Int. Cl.
*G06T 7/77* (2017.01)
*G06N 7/00* (2006.01)

(52) U.S. Cl.
CPC .............. *G06T 7/77* (2017.01); *G06N 7/005* (2013.01); *G06T 2207/20076* (2013.01); *G06T 2207/30196* (2013.01)

(58) Field of Classification Search
CPC .......... G06N 20/00; G06N 3/08; G06N 7/005; G06T 7/77; G06T 2207/20076;
(Continued)

(56) References Cited

U.S. PATENT DOCUMENTS

| 10,558,681 | B2 * | 2/2020 | Hellman | ............. G06F 16/2423 |
| 2004/0089503 | A1 * | 5/2004 | Brand | .................. B66B 1/2458 |
| | | | | 187/383 |

(Continued)

FOREIGN PATENT DOCUMENTS

| CN | 104239726 A | * | 12/2014 |
| CN | 104239726 A | | 12/2014 |
| CN | 106934229 A | * | 7/2017 |

OTHER PUBLICATIONS

X.XU et al., "Learning the rout choice behavior of subway passenger from AFC data", pp. 324-332, published on Nov. 17, 2017 (Year: 2017).*

(Continued)

*Primary Examiner* — Mekonen T Bekele
(74) *Attorney, Agent, or Firm* — Tutunjian & Bitetto, P.C.; Joseph Petrokaitis

(57) ABSTRACT

A computer-implemented method is presented for inferring passenger routes in a subway system. The method includes identifying, via an imaging device, a target passenger within the subway system, employing an exiting flow extractor to determine passenger exiting waves, employing an exiting wave identifier to mark an exiting wave of the passenger exiting waves including the target passenger, employing a supporting evidence backtracer to determine an entrance gate for each of the passengers in the marked exiting wave including the target passenger, determining a route probability for each of the passengers in the marked exiting wave including the target passenger via voting or distribution estimation processing, and employing a most probable route inferer to infer a route of the target passenger based on an aggregate route probability for all the passengers in the marked exiting wave.

20 Claims, 7 Drawing Sheets

(58) Field of Classification Search
CPC ...... G06T 2207/30196; G06K 9/00778; G06K 9/4604; G06K 9/66
See application file for complete search history.

(56) References Cited

U.S. PATENT DOCUMENTS

| | | | |
|---|---|---|---|
| 2008/0027772 A1 | 1/2008 | Gemega et al. | |
| 2008/0235138 A1* | 9/2008 | Yokota | G06Q 10/02 705/52 |
| 2010/0322516 A1* | 12/2010 | Xu | G06K 9/00778 382/173 |
| 2014/0095423 A1 | 4/2014 | Duan et al. | |
| 2014/0163860 A1 | 6/2014 | Chiantera et al. | |
| 2016/0055693 A1* | 2/2016 | Somani | G07B 15/02 340/5.61 |
| 2016/0335552 A1* | 11/2016 | Longo | G06N 5/047 |
| 2017/0148178 A1* | 5/2017 | Oami | G06T 7/292 |
| 2017/0212944 A1* | 7/2017 | Hellman | G06F 16/2423 |
| 2017/0213090 A1* | 7/2017 | Oami | G06F 3/013 |
| 2017/0351924 A1* | 12/2017 | Hotta | H04N 7/18 |
| 2020/0272954 A1* | 8/2020 | Serra | G01C 21/343 |

OTHER PUBLICATIONS

Xingtang Wu et al., "Analysis of metro network performance from a complex network perspective" 2017 Elsevier, (Year: 2017).*

Abdelfattah IDRI et al., "A new time-dependent shortest path algorithm for multimodal transportation network", 2017 Published by Elsevier B (Year: 2017).*

Juanjuan Zhao, F et al., "Estimation of Passenger Route Choice Pattern Using Smart Card Data for Complex Metro Systems" IEEE Transactions On Intelligent Transportation Systems, vol. 18, No. 4, Apr. 2017 (Year: 2017).*

Xu et al., Learning the route choice behavior of subway passengers from AFC data, Expert Systems With Applications. vol. 95. Apr. 1, 2018. pp. 324-332.

* cited by examiner

PASSENGER TRAVEL ROUTE INFERENCING IN A SUBWAY SYSTEM

BACKGROUND

Technical Field

The present invention relates generally to mass transit systems, and more specifically, to passenger travel route inferencing in a subway system.

Description of the Related Art

Often, management and control of mass transit systems cannot keep up with the growth in passenger traffic. Traffic peaks occur daily during work commutes, during bad weather, or during sporting and other events drawing large crowds. Traffic peaks can lead to bottlenecks and potential breakdowns in the system. Frequently, passengers only board a subway car or train at a few locations, for example, in the vicinity of access points such as escalators or stairs, leaving some doors of the subway train unused. Passengers are likely to avoid traveling any distance to another door because it is unknown whether the car further down has available seats. Thus, the majority of passengers prefer to board at the door closest to them, rather than using a door further away and taking the risk there will be no available seats. Additionally, many passengers take different routes to reach the same destination based on such factors as fastest path, shortest path or less crowded path. This can alter the flow distribution on different routes and cause further passenger traffic.

SUMMARY

In accordance with an embodiment, a method is provided for inferring passenger routes in a subway system. The method includes identifying, via an imaging device, a target passenger within the subway system, employing an exiting flow extractor to determine passenger exiting waves, employing an exiting wave identifier to mark an exiting wave of the passenger exiting waves including the target passenger, employing a supporting evidence backtracer to determine an entrance gate for each of the passengers in the marked exiting wave including the target passenger, determining a route probability for each of the passengers in the marked exiting wave including the target passenger via voting or distribution estimation processing, and employing a most probable route inferer to infer a route of the target passenger based on an aggregate route probability for all the passengers in the marked exiting wave.

In accordance with another embodiment, a system is provided for inferring passenger routes in a subway system. The system includes an exiting flow extractor employed to determine passenger exiting waves, an exiting wave identifier employed to mark an exiting wave of the passenger exiting waves including a target passenger identified via an imaging device in the subway system, a supporting evidence backtracer employed to determine an entrance gate for each of the passengers in the marked exiting wave including the target passenger and to determine a route probability for each of the passengers in the marked exiting wave including the target passenger via voting or distribution estimation processing, and a most probable route inferer employed to infer a route of the target passenger based on an aggregate route probability for all the passengers in the marked exiting wave.

In accordance with yet another embodiment, a non-transitory computer-readable storage medium comprising a computer-readable program for inferring passenger routes in a subway system is presented. The non-transitory computer-readable storage medium performs the steps of identifying, via an imaging device, a target passenger within the subway system, employing an exiting flow extractor to determine passenger exiting waves, employing an exiting wave identifier to mark an exiting wave of the passenger exiting waves including the target passenger, employing a supporting evidence backtracer to determine an entrance gate for each of the passengers in the marked exiting wave including the target passenger, determining a route probability for each of the passengers in the marked exiting wave including the target passenger via voting or distribution estimation processing, and employing a most probable route inferer to infer a route of the target passenger based on an aggregate route probability for all the passengers in the marked exiting wave.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

DETAILED DESCRIPTION

Embodiments in accordance with the present invention provide methods and devices for inferring passengers most probable travel routes within a subway system. Data is collected from exiting passenger waves to infer a most probable route. An exiting flow wave identifier determines groups of exiting waves according to exiting time distributions at subway stations. A supporting evidence backtracer determines evidence from deterministic route passengers. A most probable route inferer combines exiting flow waves and supporting evidence from individual passengers. A passenger route preference learning component can be employed to learn route preferences of frequent travel passengers stored in a training or learning database and use such training data to aid in accurate inferring of travel routes of passengers.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
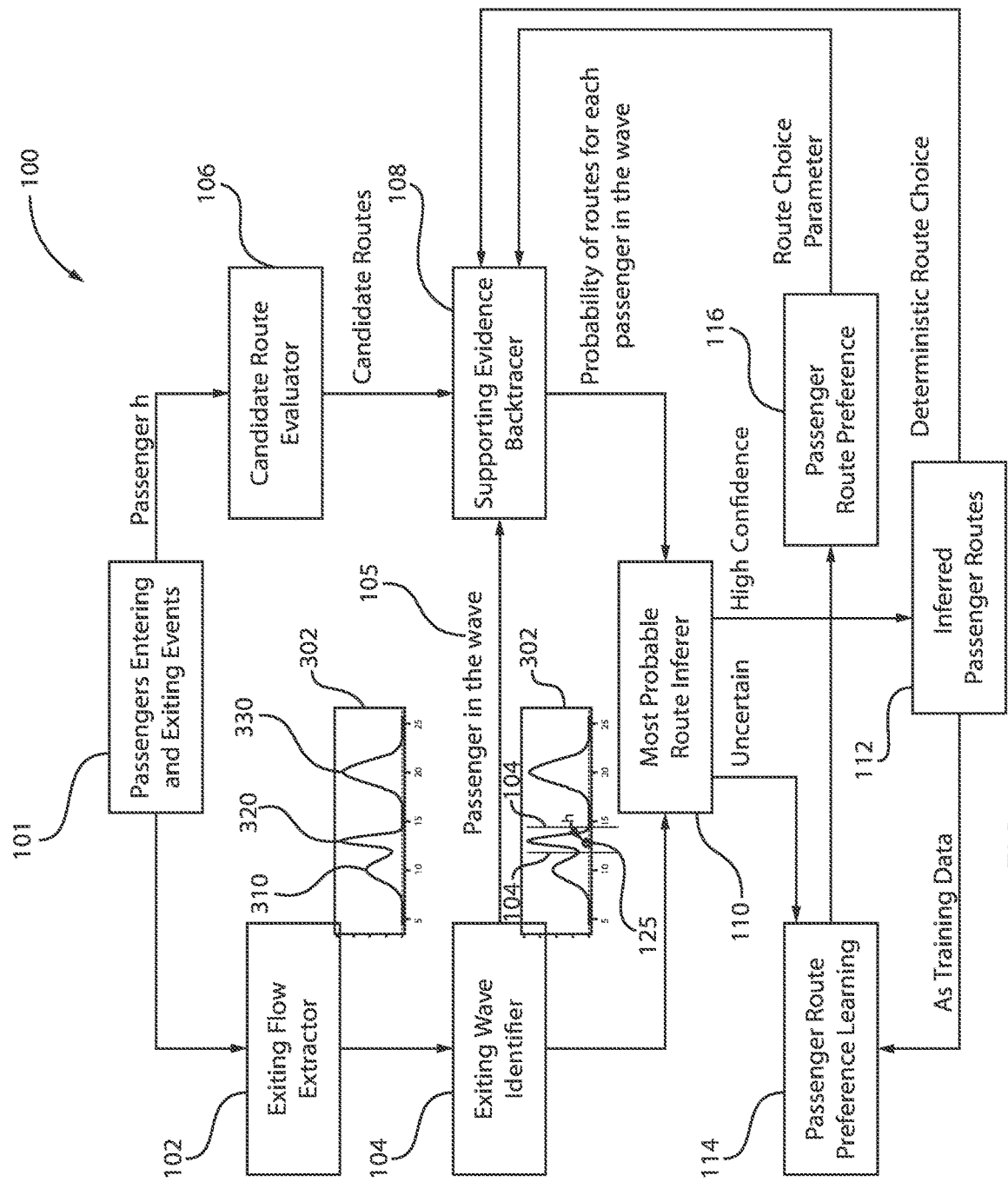
FIG. 1 is an exemplary system architecture for passenger travel route inferencing in a subway system, in accordance with embodiments of the present invention.

FIG. 1 is an exemplary system architecture for passenger travel route inferencing in a subway system, in accordance with embodiments of the present invention.

The travel route inferencing system 100 includes a plurality of passenger entering and exiting events 101. Passengers enter and exit the subway system 500 (FIG. 5) through a plurality of entrances and exits od subway stations. Passenger entering and exiting information is thus tracked and monitored continuously, and in real-time.

An exit flow extractor 102 keeps track of passengers flowing out of every exit in a subway system. The exit flow extractor 102 can communicate with a plurality of imaging devices, such as cameras 530 (FIG. 5) that are installed and operated at each of the exit gates of the subway system. The exit flow extractor 102 can count, record, and store the number of passengers that exit each exit gate in the subway system. The exit flow extractor 102 can determine the number of passengers exiting each exit gate every hour, every few hours, every 24 hours, etc. The time distribution can be determined by the user or subway system operators. A sample time distribution graph 302 is shown. The time distribution graph 302 depicts three waves, that is, a first wave of passengers 310, a second wave of passengers 320, and a third wave of passengers 330. The first wave of passengers 310 can be detected at time 10, the second wave of passengers 320 can be detected at time 14, and the third wave of passengers 330 can be detected at time 20. Thus, in a time frame or time window defined from 0 to 30, e.g., 0 to 30 minutes, three waves of passengers 310, 320, 330 are detected. Thus, the exit flow extractor 102 can identify groups of exiting passenger waves according to the exiting events time distribution.

An exiting wave identifier 104 can identify a wave of passengers 105 that exit an exit gate of the subway system. The wave of passengers 105 can be a predetermined or predefined or pre-established number of passengers. For example, the number can be set to be at least 5 passengers or at least 10 passengers, etc. Thus, a user can define the wave of passengers 105 to be set at a certain number. That number can be modified based on a number of variables or factors. For example, the wave of passengers can be set to a higher number at peak times, whereas the wave of passengers can be set to a lower number at non-peak times. At peak times, e.g., a wave can be defined to have, say, over 15 passengers.

An exiting wave identifier 104 can use markers or identifiers, e.g., two parallel lines in which a wave is confined within. In the instant example, the second wave of passengers 320 are confined within wave identifiers 104. The second wave of passengers 320 was selected because the candidate or target passenger 125, who is being tracked and monitored, belongs to this wave.

A candidate route evaluator 106 evaluates the potential routes of a candidate or target passenger, h or 125. The candidate routes can be diversified even for the same pair of origination and destination points. The candidate routes can include a faster path, a shortest path, a most comfortable path (less crowded), a least walking path, a least exchange path, a barrier free path, a familiar path, an over-ground path, etc.

A supporting evidence backtracer 108 finds evidence from deterministic route passengers. The supporting evidence backtracer 108 computes a probability of routes for each passenger in the wave (where target passenger 125 was identified in). Thus, for all passengers in an identified exit wave, the backtracer 108 can trace back each passenger's entrance information to find evidence of a route choice.

A most probable route inferer 110 combines the data or information from the exiting wave identifier 104 and the supporting evidence backtracer 108. The most probable route inferer 110 can infer the most probable route of a candidate passenger 125. The most probable route inferer infers a route of the target passenger 125 based on an aggregate route probability for all the passengers (e.g., x, y, z, . . . ) in the marked exiting wave. The aggregate route probability is the cumulative or combined probability derived from the probabilities of each of the passengers in the identified wave. The aggregate probability can be an average of all the probabilities of all the passenger in the identified wave.

If the most probable route inferer 110 has a high confidence that candidate passenger 125 took a certain route, the passenger route can be inferred and provided to an inferred passenger route module 112 that can display such information to, e.g., subway system operators. The inferred passenger routes 112 are fed back as learning data or training data to the passenger route preference learning module 114. The inferred passenger routes 112 are also fed back to the supporting evidence backtracer 108.

If the most probable route inferer 110 is uncertain of which route the candidate passenger took, then a passenger route preference learning module 114 can be employed.

Therefore, when the aggregate route probability (of all passengers in the identified wave) exceeds a predetermined threshold value, the route of the target passenger 125 is inferred with a high confidence score. If, the predetermined threshold value is, e.g., 90, and the confidence score of the majority of the passengers is 92 that they took route A, then the predetermined threshold value has been exceeded. When the aggregate route probability is below a predetermined threshold value, a passenger route preference learning module 114 is employed to determine the route of the target passenger 125. In other words, supplemental information is needed to supplement the inference determination when the initial inference is deemed to be uncertain.

The passenger route preference learning module 114 can learn the route preferences 116 of frequent travel passengers and provide the route preferences 116 back to the supporting evidence backtracer 108, which can supplement and enhance the supporting effectiveness of the inference system 100. The passenger route preference learning module 114 uses learning data or training data from a historical passenger route database 430 to determine the route of the target passenger 125.

The learning module 114 can employ deep learning to create the trained data. Deep-learning is a type of machine learning that can involve training a model in a supervised or unsupervised setting. Deep-learning models can be trained to learn representations of data. As an example and not by way of limitation, a deep-learning model can represent data as vectors of passenger entering and exiting values. Deep-learning models can be used in classification of data. Classification involves determining which of a set of categories a data point belongs to by training the deep-learning model. The deep-learning model can be a machine-learning model, a neural network, a latent neural network, any other suitable deep-learning model, or any combination thereof. The deep-learning model can be trained to identify preferred passenger routes. The deep-learning model can include one or more indices, which can be dynamically updated as the deep-learning model is trained. The one or more indices can be generated during a training phase of deep-learning model. Deep-learning model can be, for example, a neural network or a latent neural network. Deep-learning model can be initialized using a random distribution. That is, the deep-learning model can initially have randomly-assigned mappings of previous passenger routes or frequently traveled passengers in order to make predictions regarding potential passenger routes. The training data can be derived from patterns of passenger flows in a subway system that were accumulated over a period of time.

Figure 2:
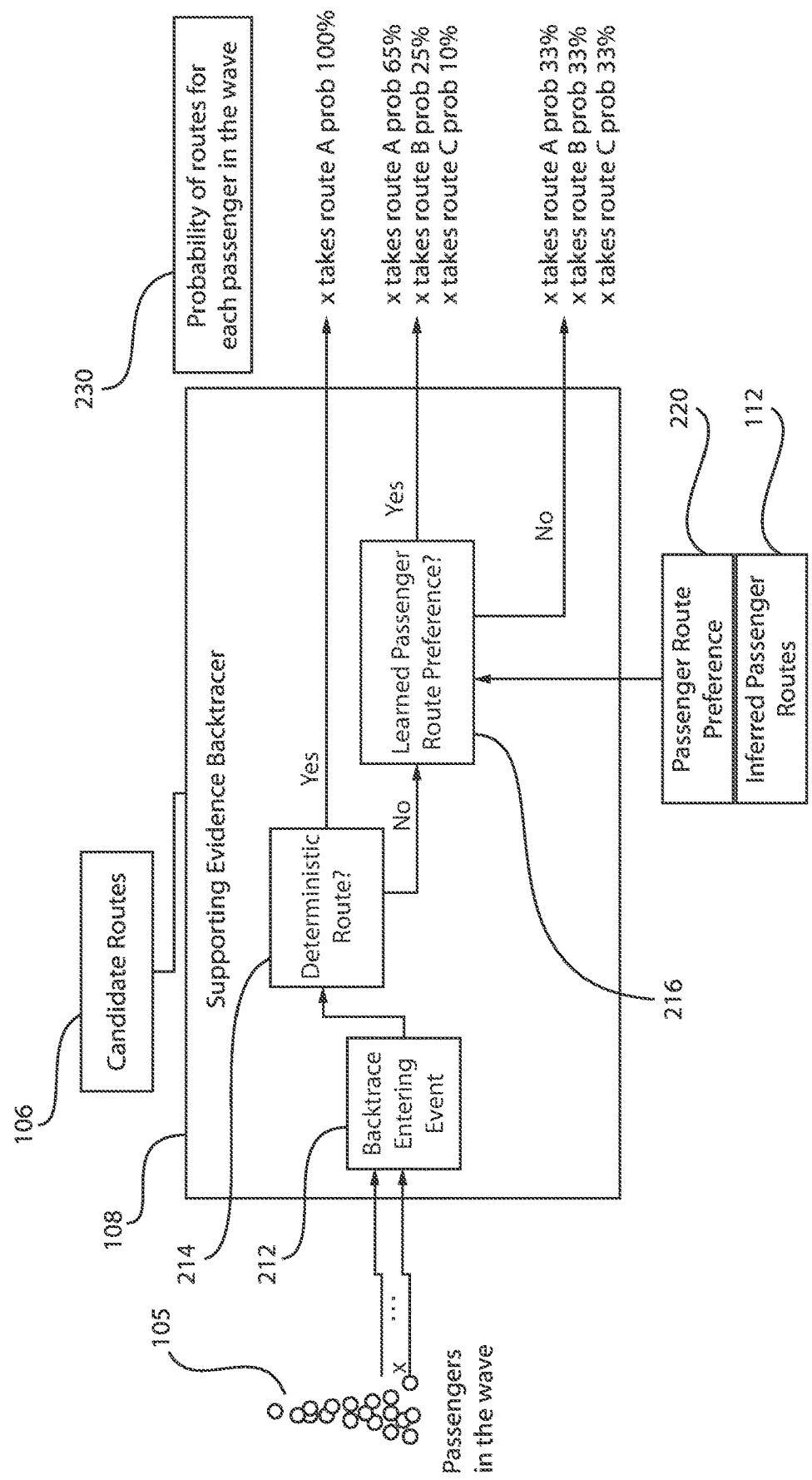
FIG. 2 is a block/flow diagram of an exemplary supporting evidence backtracer, in accordance with an embodiment of the present invention.

FIG. 2 is a block/flow diagram of an exemplary supporting evidence backtracer, in accordance with an embodiment of the present invention.

The supporting evidence backtracer 108 receives data related to passengers in wave 105 and candidate routes 106, and determines probability of routes 230 for each passenger in the wave 105 where the candidate passenger 125 has been detected. The data related to passengers in wave 105 are evaluated by a back trace entering event module 212. The back trace entering event module 212 determines the entry gate of each passenger in the selected or identified wave 105 where target candidate 125 was found.

At block 214, it is determined whether this is a deterministic route for passenger x? Passenger x is a passenger found in wave 105 with target passenger h. A deterministic route is an advance determination of a route. If YES, then it is 100% probable that x took route A. If NO, then the process proceeds to block 216 where it is determined whether the passenger route preference has been learned. IF YES, then there is a 65% probability that passenger x took route A, a 25% probability that passenger x took route B, and a 10% probability that passenger x took route C. If NO, then there is a 33% probability that passenger x took route A, a 33% probability that passenger x took route B, and a 33% probability that passenger x took route C. Therefore, if the probability can be determined with a high confidence or a high confidence score that exceeds a predetermined value, say 75%, then it is highly likely that passenger x took a certain route (e.g., route A). If the probability cannot be determined with a high confidence or a high confidence score that exceeds a predetermined value, then training data is employed to better infer the passenger route of passenger x.

The learning of the passenger route preference at block 216 is provided by the passenger route preference learning module 114 (FIG. 1), which feeds block 216 with inferred passenger routes 112 and passenger route preferences 220.

Therefore, a passenger can first be identified, e.g., as passenger h. A subway system operator may wish to determine the route passenger h took to arrive at a specific exit in the subway system. Thus, passenger h is monitored and detected leaving a specific exit of a subway system. For example, passenger h exited the $42^{nd}$ street, Times Square exit in the New York (N.Y.) subway system. Passenger h exits the $42^{nd}$ street, Times Square exit in a wave. The wave includes a plurality of other passengers. The wave is extracted from, e.g., the exiting events time distribution. The wave including passenger h is identified or marked or highlighted or designated for further processing. Then, for all the passengers in the identified exiting wave, back trace their entrances. For example, other passengers in the wave are identified as x, y, and z. The exemplary methods determine the entrance gate of passengers x, y, and z in the identified wave including passenger h. This aids in finding evidence of the route choice.

It is determined that passenger x entered the NY subway system from the $66^{th}$ street, Lincoln Center entrance. This can be evidence that passenger x took route A to arrive at the $42^{nd}$ street, Times Square exit. It is further determined that passenger y entered the NY subway system from the $74^{th}$ street, Jackson Heights entrance in Queens. This can be evidence that passenger y took route B to arrive at the $42^{nd}$ street, Times Square exit. It is further determined that passenger z entered the NY subway from $14^{th}$ street, Union Square. This can be evidence that passenger z took route C to arrive at the $42^{nd}$ street, Times Square exit. These evidences are accumulated for each passenger in the identified wave and a vote or distribution estimation is performed to infer the route that was taken by passenger h. If the vote or distribution estimation results in a high probability, then there is a high certainty that passenger h took a certain route. If the vote or distribution estimation results in a low probability, then deep learning techniques can be applied to infer the route of passenger h. The deep learning techniques can employ deep learning databases including prior historical data related to previous passenger routes (trained data). Such historical passenger route information can be utilized in combination with the current passenger data derived from passengers in the identified wave to infer the route of passenger h with a higher probability.

As a result, if 50 passengers were identified in the wave including passenger h, and if 30 passengers were determined taking Route A, 5 were identified taking Route B, 5 were identified taking Route C, and 10 were determined taking other candidate routes, then it could be said and inferred with a high probability that passenger h took Route A to arrive at the $42^{nd}$ street, Times Square exit. In this voting or distribution estimation result, the entrances for each passenger were determined, counted, and tallied, such that a determination was made that 30 passengers took route A (at different stations within the NY subway system) to arrive at the common destination point. Therefore, the exemplary embodiments leverage the passenger flow phenomenon exhibited in subway stations. In other words, evidence from exiting waves can be employed to infer passenger routes. Such information exit flow can be used to infer passenger routes with a high level of confidence. Such inferred passenger routes can be displayed on a display screen of a computing device for the subway operators to analyze or evaluate. Such inferred passenger routes can also be fed back to the passenger route preference learning module as trained data. Thus, the training database 430 (FIG. 4) can be constantly or continuously updated and refined, in real-time, as further flow evaluations are made within the subway system.

Figure 3:
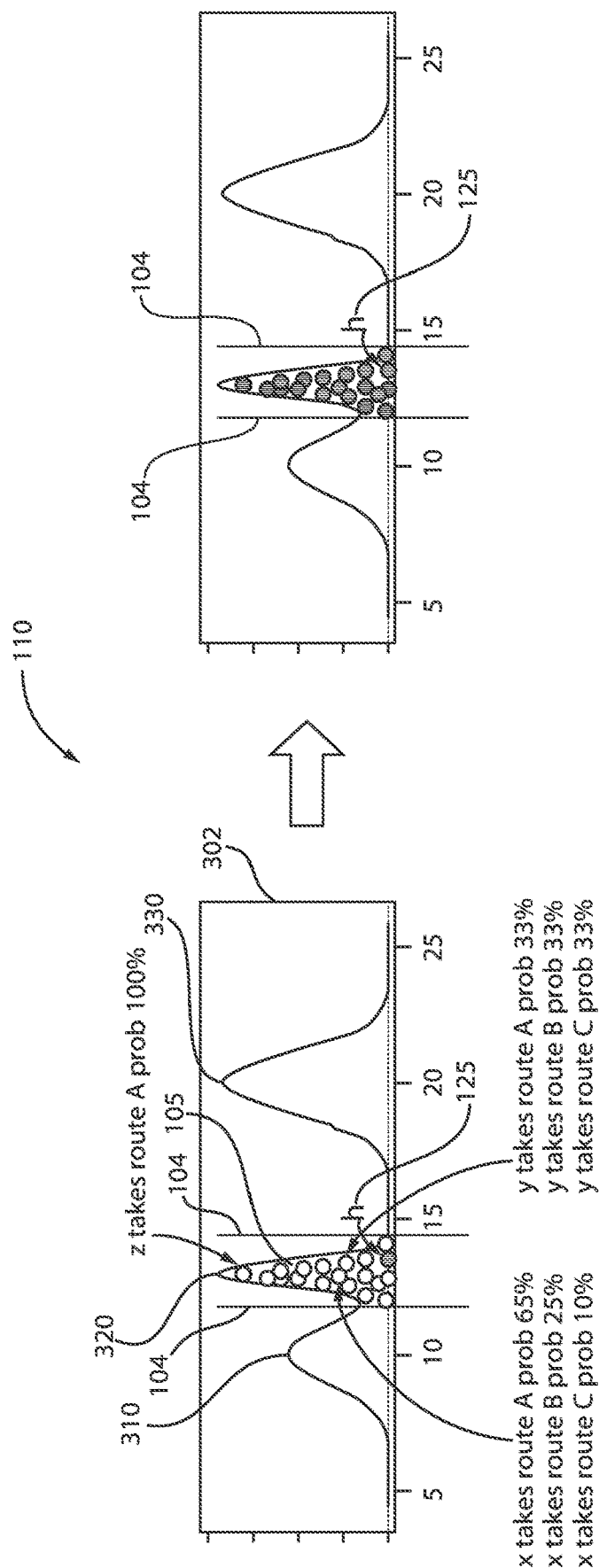
FIG. 3 is a block/flow diagram of an exemplary most probable route inferer, in accordance with an embodiment of the present invention.

FIG. 3 is a block/flow diagram of an exemplary most probable route inferer, in accordance with an embodiment of the present invention.

The most probable route inferer 110 combines the data or information from the exiting wave identifier 104 and the supporting evidence backtracer 108. The most probable route inferer 110 can infer the most probable route of a candidate passenger 125.

A sample time distribution graph 302 is shown. The time distribution graph 302 depicts three waves, that is, a first wave of passengers 310, a second wave of passengers 320, and a third wave of passengers 330. The first wave of passengers 310 can be detected at time 10, the second wave of passengers 320 can be detected at time 14, and the third wave of passengers 330 can be detected at time 20. Thus, in a time frame or time window defined from 0 to 30, e.g., 0 to 30 minutes, three waves of passengers 310, 320, 330 are detected.

An exiting wave identifier 104 can identify a wave of passengers 105 that exit an exit gate of the subway system. An exiting wave identifier 104 can use markers or identifiers, e.g., two parallel lines in which a wave is confined within. One skilled in the art can contemplate any other type of markings or identifiers to highlight the selected wave.

These evidences are accumulated for each passenger in the identified wave and a vote or distribution estimation is performed to infer the route that was taken by passenger h. If the vote or distribution estimation results in a high probability, then there is a high certainty that passenger h took a certain route. If the vote or distribution estimation results in a low probability, then deep learning techniques can be applied to infer the route of passenger h.

Figure 4:
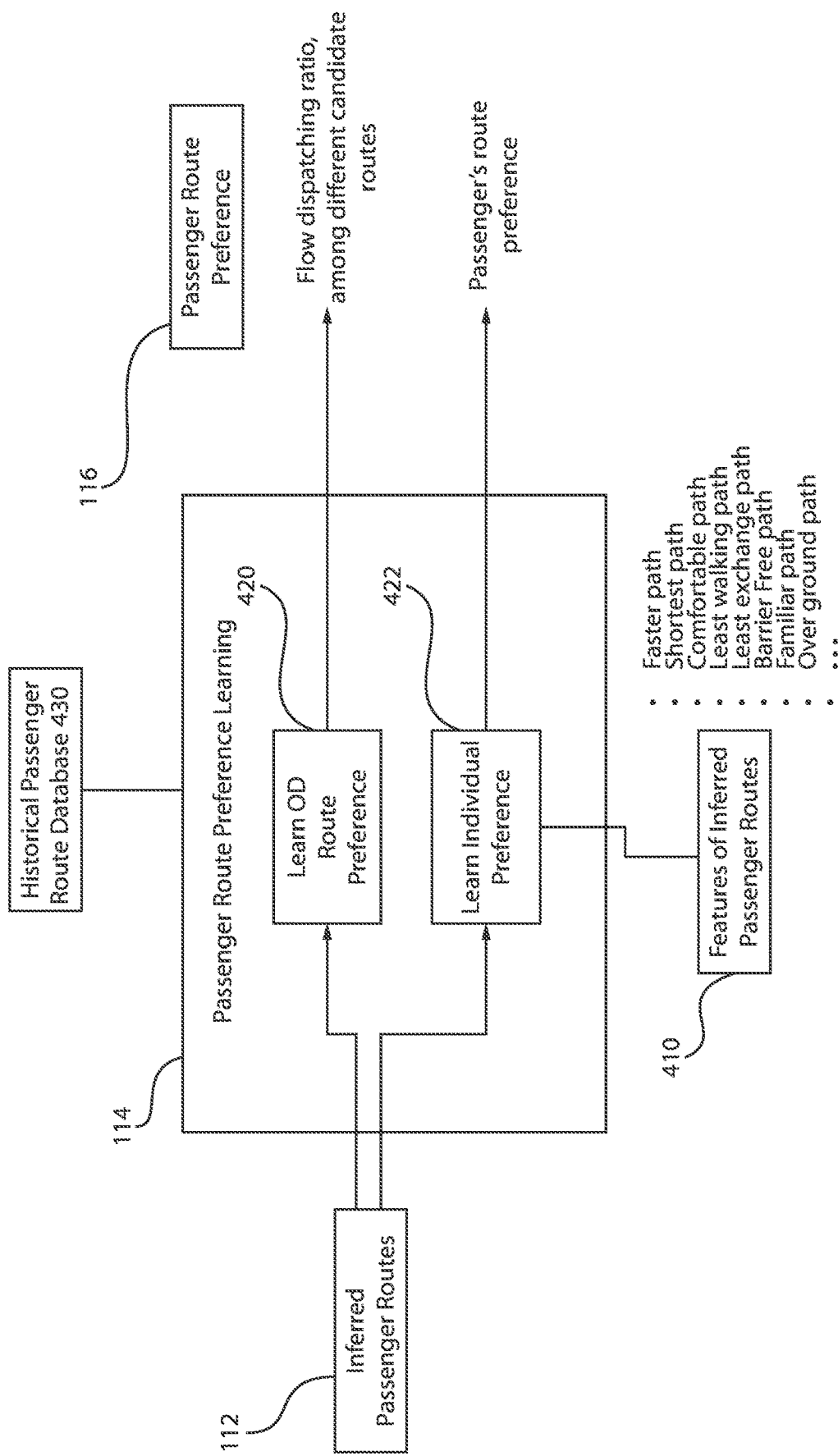
FIG. 4 is a block/flow diagram of an exemplary passenger route preference learning system, in accordance with an embodiment of the present invention.

FIG. 4 is a block/flow diagram of an exemplary passenger route preference learning system, in accordance with an embodiment of the present invention.

The inferred passenger routes 112 can be fed into the passenger route preference learning module 114. The passenger route preference learning module 114 includes a first module 420 and a second module 422. The first module 420 learns origination/destination route preferences and the second module 422 learns individual preferences. The individual preferences can be learned from features of inferred passenger routes module 410. The features can include, e.g., a faster path, a shortest path, a most comfortable path (less crowded), a least walking path, a least exchange path, a barrier free path, a familiar path, an over-ground path, etc. The passenger route preference learning module 114 then creates passenger route preferences 116 based on the first and second modules 420, 422. The passenger route preference learning module 114 can employ a historical passenger route database 430 that includes the trained data. The trained data can be continuously updated in real-time.

Figure 5:
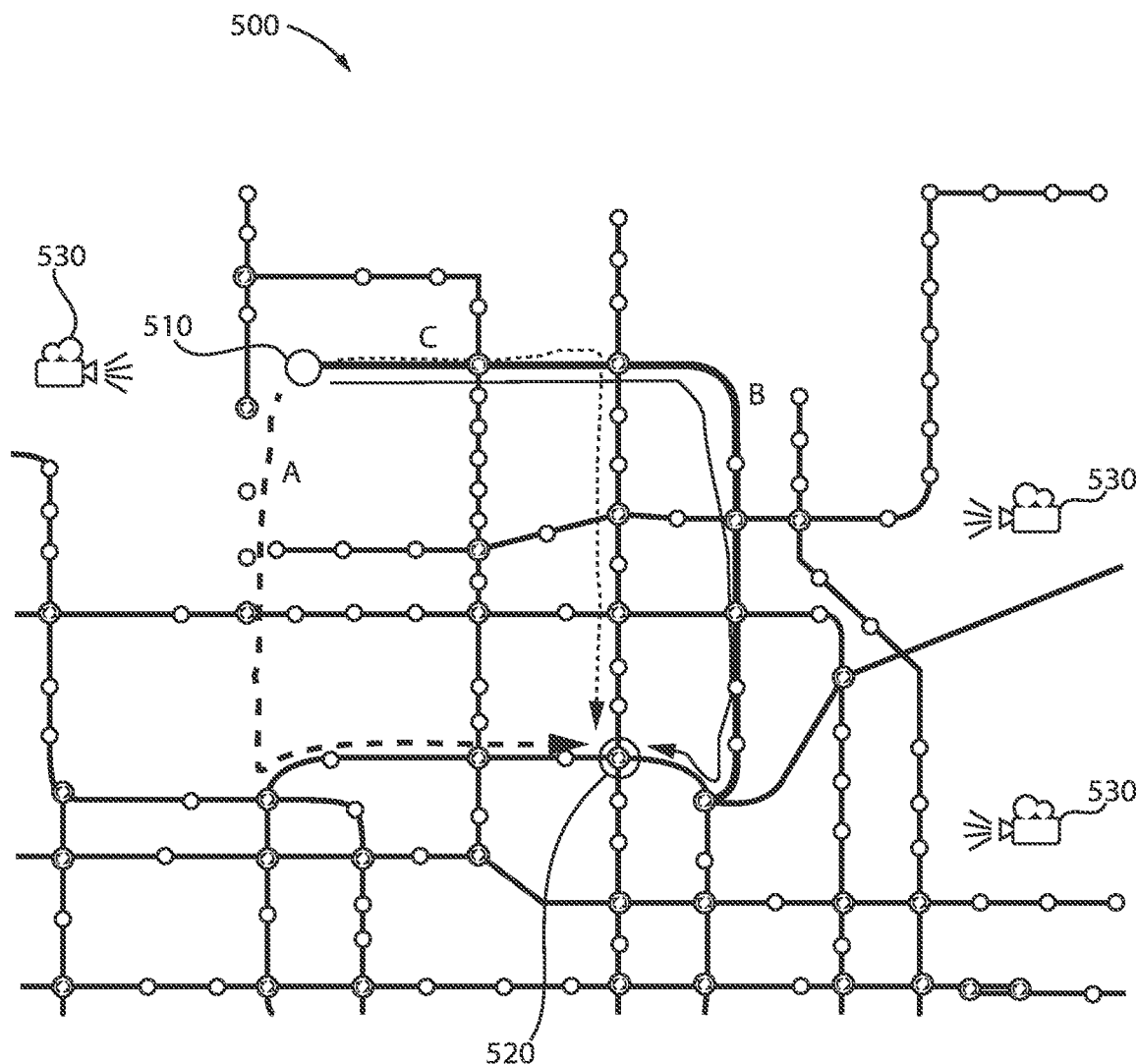
FIG. 5 is a block/flow diagram of a subway system where passengers enter entrance A and exit entrance B via different routes, in accordance with an embodiment of the present invention.

FIG. 5 is a block/flow diagram of a subway system where passengers enter entrance A and exit entrance B via different routes, in accordance with an embodiment of the present invention.

The subway system 500 depicts an entrance point or gate 510 and an exit point or gate 520. Passengers entering the gate 510 can take at least three different routes to reach destination gate 520. In one instance, passenger x can take route A, passenger y can take route B, and passenger z can take route C. Thus, three different paths can be used to reach a certain common destination. Passenger x can take route A because it is the faster route. Passenger y can take route B because it is the least crowded route (even though it appears to be the longest route). Passenger z can take route C because it is a least walking path, e.g., the subway train can be at the nearest convenient exit to access his/her workplace faster (with less walking). Imaging devices or cameras 530 can be located or positioned throughout the subway system 500, at least at every entrance and exit point within the subway system 500. A route of a candidate passenger h or 125, can be inferred based on the route information of passengers x, y, and z, assuming passenger h exits at exit gate 520 in the same wave as passengers x, y, and z.

Figure 6:
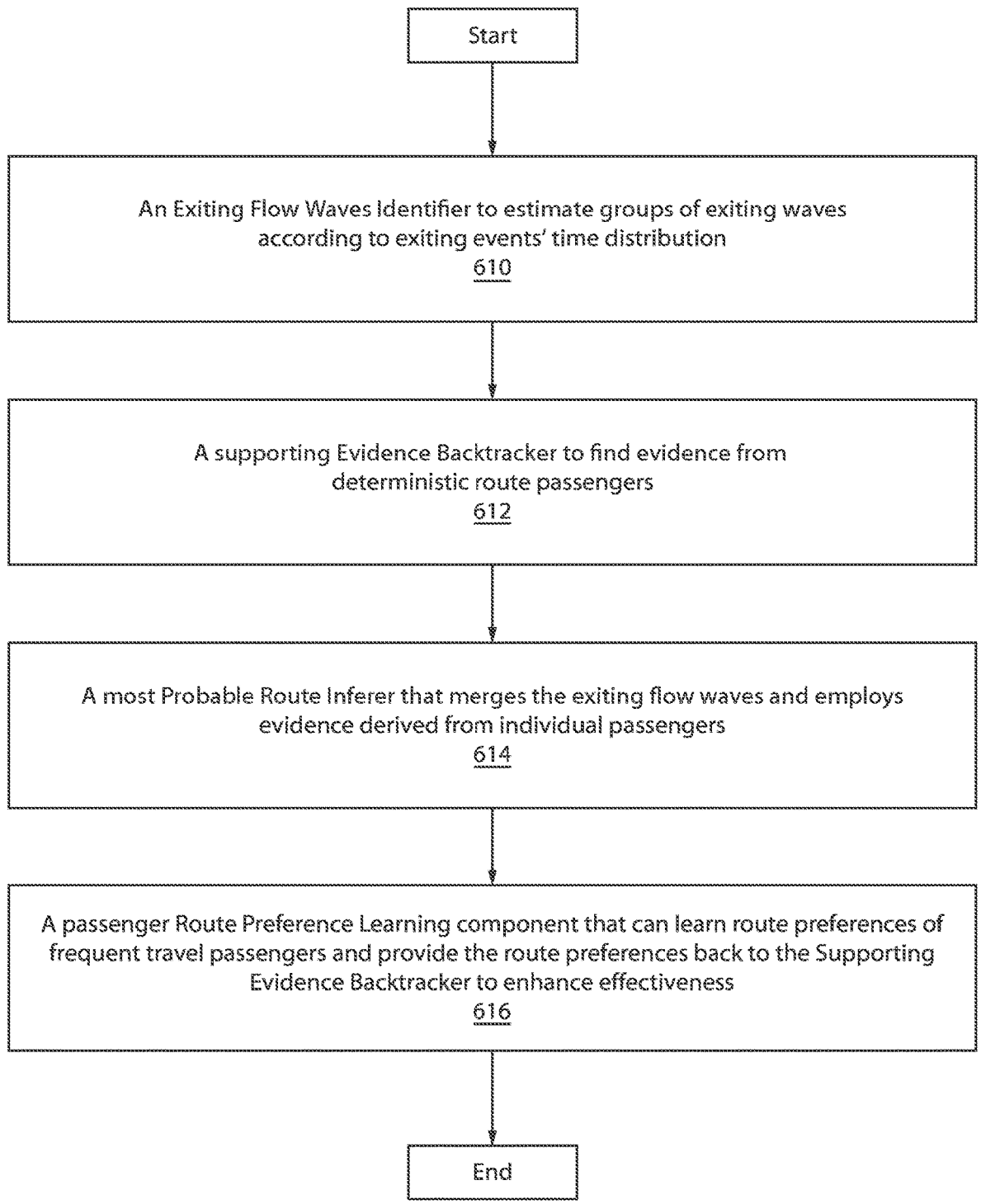
FIG. 6 is a block/flow diagram illustrating an example method for passenger travel route inferencing in a subway system, in accordance with an embodiment of the present invention.

FIG. 6 is a block/flow diagram illustrating an example method for passenger travel route inferencing in a subway system, in accordance with an embodiment of the present invention.

At block 610, an exiting flow waves identifier is employed to estimate groups of exiting waves according to exiting events' time distribution.

At block 612, a supporting evidence backtracker is employed to find evidence from deterministic route passengers. The supporting evidence backtracer computes a probability of routes for each passenger in the wave (where target passenger was identified in). Thus, for all passengers in an identified exit wave, the backtracer can trace back each passengers entrance information to find evidence of a route choice.

At block 614, a most probable route inferer is employed that merges the exiting flow waves and utilizes evidence derived from individual passengers. The most probable route inferer can infer the most probable route of a candidate passenger. The most probable route inferer infers a route of the target passenger based on an aggregate route probability for all the passengers (e.g., x, y, z, . . . ) in the marked exiting wave.

At block 618, a passenger route preference learning component is employed to learn route preferences of frequent travel passengers and provide the route preferences back to the supporting evidence backtracker to enhance effectiveness. The passenger route preference learning module uses training data from a historical passenger route database to determine the route of the target passenger.

Figure 7:
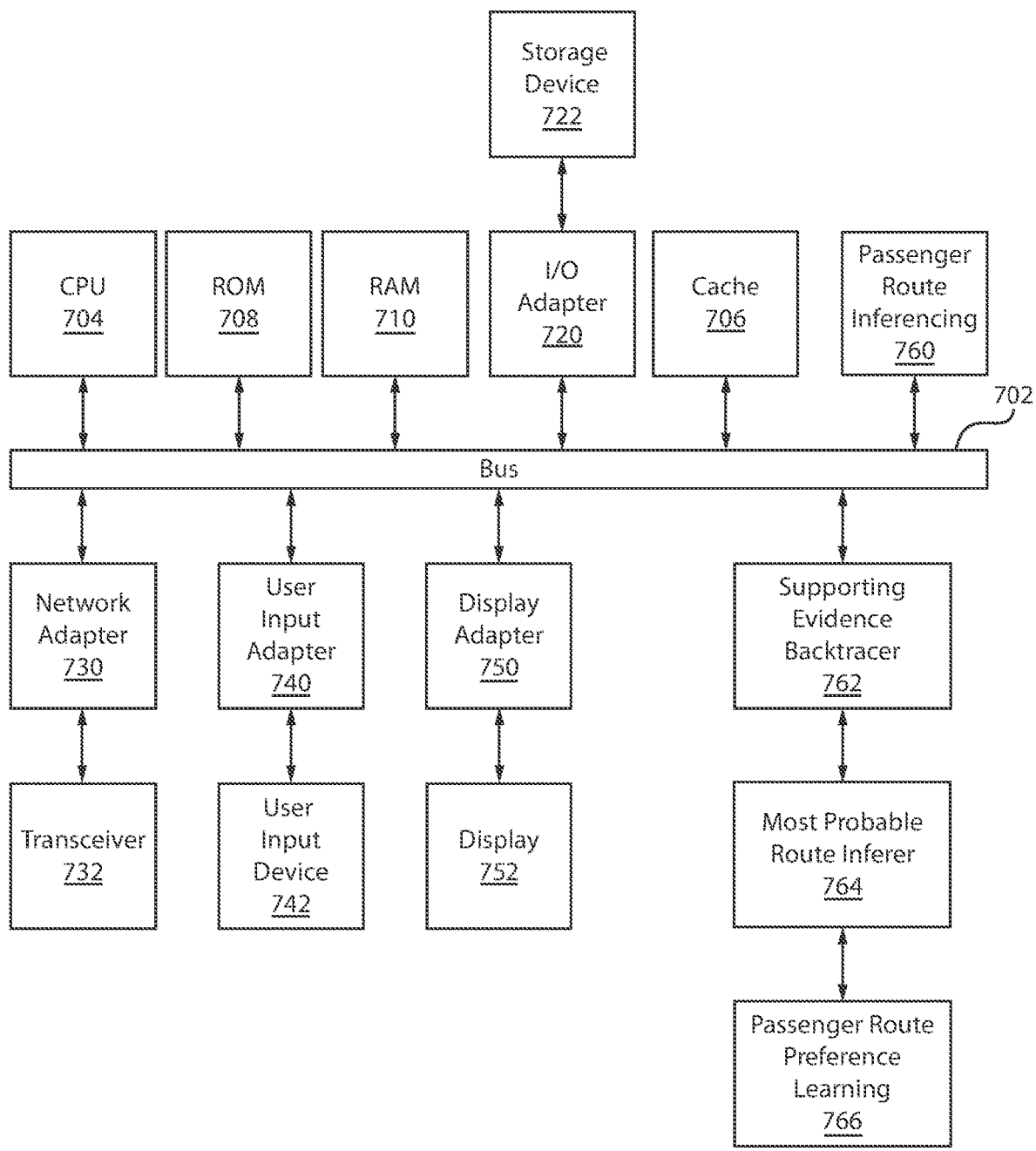
FIG. 7 is a block/flow diagram illustrating an example processing system for passenger route inferencing, in accordance with an embodiment of the present invention.

FIG. 7 is a block/flow diagram illustrating an example processing system for passenger route inferencing, in accordance with an embodiment of the present invention.

The processing system includes at least one processor (CPU) 704 operatively coupled to other components via a system bus 702. A cache 706, a Read Only Memory (ROM) 708, a Random Access Memory (RAM) 710, an input/output (I/O) adapter 720, a network adapter 730, a user interface adapter 740, and a display adapter 750, are operatively coupled to the system bus 702. Additionally, a passenger route inferencing module 760 can communicate through the system bus 702. Moreover, passenger route inferencing module 760 can employ a supporting evidence backtracer 762, a most probable route inferer 764, and a passenger route preference learning module 766.

A storage device 722 is operatively coupled to system bus 702 by the I/O adapter 720. The storage device 722 can be any of a disk storage device (e.g., a magnetic or optical disk storage device), a solid state magnetic device, and so forth.

A transceiver 732 is operatively coupled to system bus 702 by network adapter 730.

User input devices 742 are operatively coupled to system bus 702 by user interface adapter 740. The user input devices 742 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 742 can be the same type of user input device or different types of user input devices. The user input devices 742 are used to input and output information to and from the processing system.

A display device 752 is operatively coupled to system bus 702 by display adapter 750.

Of course, the processing system for passenger route inferencing can also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system for passenger route inferencing are readily contemplated by one of ordinary skill in the art given the teachings of the present invention provided herein.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for inferring passenger routes from exit waves in a subway system (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for inferring passenger routes in a subway system, the method comprising:
   identifying, via an imaging device, a target passenger within the subway system;
   employing an exiting flow extractor to determine passenger exiting waves at every exit of the subway system;
   marking, via an exiting wave identifier, an exiting wave of the passenger exiting waves including the target passenger according to exiting time distributions at subway stations, wherein a number of passengers in each of the passenger exiting waves is predetermined by a user;
   determining, via a supporting evidence backtracer, an entrance gate for each of the passengers in the marked exiting wave including the target passenger;
   determining a route probability for each of the passengers in the marked exiting wave including the target passenger via voting or distribution estimation processing; and
   inferring, via a most probable route inferer, a route of the target passenger based on an aggregate route probability for all the passengers in the marked exiting wave, wherein, when the aggregate route probability is below a predetermined threshold value, a passenger route preference learning module is employed to determine the route of the target passenger, the preference learning module including a first module for learning origination/destination preferences and a second module for learning individual passenger preferences.

2. The method of claim 1, wherein, when the aggregate route probability exceeds a predetermined threshold value, the route of the target passenger is inferred with a high confidence score.

3. The method of claim 2, wherein the inferred route of the target passenger is fed back into the supporting evidence backtracer.

4. The method of claim 1, wherein the exiting time distributions are displayed via a time distribution graph.

5. The method of claim 1, wherein the passenger route preference learning module uses training data from a historical passenger route database to determine the route of the target passenger.

6. The method of claim 1, wherein the passenger route preference learning module uses one or more route variables to learn the individual passenger preferences.

7. The method of claim 6, wherein the one or more variables include at least one of faster route information, shortest route information, comfortable route information, least walking route information, least exchange route information, barrier free route information, and familiar route information or a combination thereof.

8. A non-transitory computer-readable storage medium comprising a computer-readable program executed on a processor in a data processing system for inferring passenger routes in a subway system, wherein the computer-readable program when executed on the processor causes a computer to perform the steps of:
identifying, via an imaging device, a target passenger within the subway system;
employing an exiting flow extractor to determine passenger exiting waves at every exit of the subway system;
marking, via an exiting wave identifier, an exiting wave of the passenger exiting waves including the target passenger according to exiting time distributions at subway stations, wherein a number of passengers in each of the passenger exiting waves is predetermined by a user;
determining, via a supporting evidence backtracer, an entrance gate for each of the passengers in the marked exiting wave including the target passenger;
determining a route probability for each of the passengers in the marked exiting wave including the target passenger via voting or distribution estimation processing; and
inferring, via a most probable route inferer, a route of the target passenger based on an aggregate route probability for all the passengers in the marked exiting wave, wherein, when the aggregate route probability is below a predetermined threshold value, a passenger route preference learning module is employed to determine the route of the target passenger, the preference learning module including a first module for learning origination/destination preferences and a second module for learning individual passenger preferences.

9. The non-transitory computer-readable storage medium of claim 8, wherein, when the aggregate route probability exceeds a predetermined threshold value, the route of the target passenger is inferred with a high confidence score.

10. The non-transitory computer-readable storage medium of claim 9, wherein the inferred route of the target passenger is fed back into the supporting evidence backtracer.

11. The non-transitory computer-readable storage medium of claim 8, wherein the exiting time distributions are displayed via a time distribution graph.

12. The non-transitory computer-readable storage medium of claim 8, wherein the passenger route preference learning module uses training data from a historical passenger route database to determine the route of the target passenger.

13. The non-transitory computer-readable storage medium of claim 8, wherein the passenger route preference learning module uses one or more route variables to learn the individual passenger preferences.

14. The non-transitory computer-readable storage medium of claim 13, wherein the one or more variables include at least one of faster route information, shortest route information, comfortable route information, least walking route information, least exchange route information, barrier free route information, and familiar route information or a combination thereof.

15. An apparatus for inferring a passenger route in a subway system, the apparatus comprising:
an exiting flow extractor to determine passenger exiting waves at every exit of the subway system;
an exiting wave identifier to mark an exiting wave of the passenger exiting waves including a target passenger identified via an imaging device in the subway system according to exiting time distributions at subway stations, wherein a number of passengers in each of the passenger exiting waves is predetermined by a user;
a supporting evidence backtracer to determine an entrance gate for each of the passengers in the marked exiting wave including the target passenger and to determine a route probability for each of the passengers in the marked exiting wave including the target passenger via voting or distribution estimation processing; and
a most probable route inferer to infer a route of the target passenger based on an aggregate route probability for all the passengers in the marked exiting wave, wherein, when the aggregate route probability is below a predetermined threshold value, a passenger route preference learning module is employed to determine the route of the target passenger, the preference learning module including a first module for learning origination/destination preferences and a second module for learning individual passenger preferences.

16. The apparatus of claim 15, wherein, when the aggregate route probability exceeds a predetermined threshold value, the route of the target passenger is inferred with a high confidence score.

17. The apparatus of claim 16, wherein the inferred route of the target passenger is fed back into the supporting evidence backtracer.

18. The apparatus of claim 15, wherein the exiting time distributions are displayed via a time distribution graph.

19. The apparatus of claim 15, wherein the passenger route preference learning module uses training data from a historical passenger route database to determine the route of the target passenger.

20. The apparatus of claim 15, wherein the passenger route preference learning module uses one or more route variables to learn the individual passenger preferences.

* * * * *